(12) United States Patent
Bund

(10) Patent No.: US 8,280,691 B2
(45) Date of Patent: Oct. 2, 2012

(54) ARRANGEMENT FOR EVALUATING THE MEASURED VALUES OF A MEASURED-VALUE CONVERTER

(75) Inventor: Gerhard Bund, Talstraβe (DE)

(73) Assignee: Robert Bosch GmbH, Stuttgart (DE)

( * ) Notice: Subject to any disclaimer, the term of this patent is extended or adjusted under 35 U.S.C. 154(b) by 454 days.

(21) Appl. No.: 12/507,572

(22) Filed: Jul. 22, 2009

(65) Prior Publication Data
US 2010/0023304 A1    Jan. 28, 2010

(30) Foreign Application Priority Data
Jul. 23, 2008 (DE) .......................... 10 2008 034 318

(51) Int. Cl.
*H03F 1/26* (2006.01)
(52) U.S. Cl. ...................................... 702/189
(58) Field of Classification Search ................ 702/189
See application file for complete search history.

(56) References Cited

U.S. PATENT DOCUMENTS

2004/0204896 A1* 10/2004 Schneider .................... 702/127
2008/0054891 A1*  3/2008 Dobsky .................... 324/207.26

FOREIGN PATENT DOCUMENTS

DE    3445617 A1    7/1985
EP    0 171 579    *    2/1986

* cited by examiner

*Primary Examiner* — Cindy H Khuu
(74) *Attorney, Agent, or Firm* — Hodgson Russ LLP

(57) ABSTRACT

The object of the invention is to implement an arrangement that enables maximally flexible linkage of measured-value sensing systems 12 to automation devices. This object is achieved in that an arrangement for evaluating the measured values of a measured-value converter 12 is provided, which arrangement encompasses an evaluation means 13 and a connecting means 18 for linking the evaluation means 13 to the measured-value transducer 12. Connecting means 18 in turn encompasses means 14, 15, 16, 17*a, b* that are at least in part electrically configurable, by means of parameters, in such a way that a linkage of evaluation means 13 to measured-value converters 12 that differ in terms of measured-value data transfer can be implemented.

14 Claims, 3 Drawing Sheets

ARRANGEMENT FOR EVALUATING THE MEASURED VALUES OF A MEASURED-VALUE CONVERTER

CROSS REFERENCE TO RELATED APPLICATIONS

This application claims priority of German patent application no. 10 2008 034 318.8 filed Jul. 23, 2008, which is incorporated by reference herein.

FIELD OF THE INVENTION

The invention relates to an arrangement according to the independent claims for evaluating the measured values of a measured-value converter, and to a method according to the independent claims for operating such an arrangement.

BACKGROUND OF THE INVENTION

So-called incremental rotary encoders are known for the sensing of rotation angles, for example in conjunction with electrical machines. These encoders convert the input variable, namely the rotation angle of, for example, a rotor, into a number of electrical pulses. The conversion can be achieved, for example, by optoelectronic scanning means of a rotary disk having radial transparent slots. The number of such slots defines the resolution (pulses per revolution). Incremental encoders of this kind serve, for example, to ascertain a rotation angle within a rotation range from 0 to 360 degrees. If it is desired to sense rotations beyond 360 degrees, so-called multi-turn transducers (absolute value transducers) are then known. These encompass further coding disks in addition to the coding disk for sensing the angular position, so that revolutions beyond 360 degrees can also be sensed.

So-called resolvers are also known for the sensing of rotary motions. By means of a resolver, the absolute position of the motor shaft is ascertained. The resolver is made up of a rotor coil and two stator windings offset 90 degrees from one another, and operates on the principle of the rotary transformer. The resolver additionally has a respective auxiliary winding in the stator and on the rotor, to ensure brushless voltage supply. Voltages of different magnitudes are induced in the stator windings depending on the position of the rotor. The voltages at the two stator windings are modulated in transformer fashion by the supply voltage, and have sinusoidal envelope curves. The two envelope curves are offset 90 degrees electrically from one another, and are evaluated in the inverter as to zero transition and amplitude. The absolute rotor position, rotation speed, and rotation direction can thereby be ascertained.

The aforementioned so-called transducer systems are based on a wide variety of principles and require a wide variety of control systems and furnish a wide variety of signal shapes. Each transducer type therefore requires an interface specific to it. German Application DE 34 456 17 A1, for example, describes a method and an arrangement for serially transferring the digital measured values of a measured-value converter by means of an interface relevant to the transducer described therein. For transfer of the digital measured values of a measured-value converter, in particular of an angular encoder or a linear measurement encoder, the measured values (occurring in parallel) are stored in a parallel-serial shift register and transferred serially in synchronism with a clock-timed pulse train that is generated by a processing unit that receives the measured values. This synchronous and serial transfer enables simple processing of the transferred data, and a high baud rate for the data transfer.

It is easy to recognize that the manner of operation explained in conjunction with the aforementioned German Application deviates, for example, from the previously explained manner of operation in conjunction with the resolver.

So-called drive control devices or drive amplifiers are required for the application of control to electrical machines, in particular to electrical servomotors. Said devices supply a rotary current motor with, for example, a three-phase current, and simultaneously regulate position and rotation speed utilizing the aforementioned measured-value converter signals. The measured-value converters that are in turn required for this are arranged on the rotating or moving part of the motor. When a measured-value converter of this kind is used by the device, the entire arrangement is then in a so-called closed-loop operating mode. A closed control circuit therefore exists, and the device continuously processes the signals generated by the measured-value converter in the context of control application to the electrical servomotor.

A large number of measured-value converter variants exist in the automation sector. The manufacturers of automation components endeavor to support as many measured-value converter types as possible. The problem thus exists that, in order to support as many measured-value converters as possible, a drive control unit or a drive amplifier would need to have a correspondingly large number of measured-value converter interfaces. This in turn requires increased hardware complexity and increased software outlay. Operation also becomes more complex, since the correct converter must be manually configured by the setup technician upon initial setup. In order to avoid this outlay, it would be possible to make available different drive controller variants or drive amplifiers that are tailored for specific measured-value converter types. This would, however, result in a great multiplicity of variants and versions, which is not desired by manufacturers because of the cost outlay associated therewith. In addition, the outlay on the part of customers of the component manufacturer would thereby also rise, since the aforementioned multiplicity of variants would need to be taken into consideration and managed in terms of configuration and scheduling.

SUMMARY OF THE INVENTION

The object of the invention is therefore to implement an arrangement for evaluating the measured values of a measured-value converter, which arrangement can easily be integrated into an automation component and can process a plurality of different measured-value converter signals.

The invention achieves this object by the fact that an aforementioned arrangement is provided with an evaluation means and with a connecting means for linking the evaluation means to the measured-value converter, the connecting means in turn encompassing means that are at least in part configurable in such a way that a linkage of the evaluation means to measured-value converters that differ with regard to measured-value data transfer can be implemented. This has the advantage that only a single mechanical interface needs to be provided in order to connect the measured-value converter to the arrangement, thus yield a savings in terms of hardware. Variant multiplicity and the possible connector combinations are also thereby minimized.

The fact that the aforementioned connecting means is configurable with regard to measured-value data transfer by the use of suitable means also makes possible, in addition to the capability for universal mechanical linkage of a measured-value converter already mentioned, the capability for universal electrical linkage of a measured-value converter to the arrangement.

The configurability that is provided enhances flexibility and application spectrum. The approach according to the present invention furthermore has the advantage that a computer program (e.g. firmware of a drive amplifier) present for the operation of an automation component that is usually encompassed by the arrangement according to the present invention can easily be expanded, by way of slight modifications, in such a way that configuration of the arrangement according to the present invention can also be accomplished by means of the user interface or a human-machine interface (HMI).

A switchover capability between at least one asynchronous and one synchronous measured-value data transfer is preferably provided. Those measured-value converters that use both asynchronous and/or synchronous measured-value data transfer principles are thereby supported. It is possible to switch over between these measured-value converters by simple reconfiguration (e.g. on a software basis) by means of the arrangements.

A first data transfer means that is switchable between transmit mode and receive mode is preferably provided in order to implement asynchronous measured-value data transfer. The flexibility of the arrangement is further enhanced by the fact that in order to implement synchronous measured-value data transfer, a second data transfer means is provided which is implemented in such a way that it can generate a clock cycle, the transmission and reception of measured-value data occurring by means of the first data transfer means.

This configuration of the arrangement according to the present invention thus allows the means, already recited previously, for asynchronous data transfer to be used also for synchronous data transfer, by the fact that it plays the roles of transmitting and receiving measured-value data. The second data transfer means supplies the synchronizing clock cycle required for synchronous data transfer. The aforementioned flexibility is further enhanced by the fact that the data transfer means that are used are also capable of simultaneously transmitting and/or receiving data. A further result of the aforementioned actions is that the number of connector pins for mechanical linkage of the measured-value converter to the arrangement can be reduced to a minimum, since one and the same data transfer means can be used for a wide variety of measured-value data transfer processes.

A control application matrix is preferably provided for configuring the arrangement. The control application matrix could be stored, for example, in the form of a table in a memory. The memory could be, for example, a nonvolatile memory encompassed by the arrangement according to the present invention, or a memory encompassed by a drive control unit or a drive amplifier, which memory simultaneously also encompasses parameters for parameterizing the drive control unit or drive amplifier. The aforementioned table could be organized, for example, from a plurality of rows and columns, a separate measured-data transfer process to be supported being, for example, defined by means of each row, and the configuration and/or activation, necessary for that measured-data transfer process, of the means of the arrangement necessary for implementation of the measured data transfer process being defined by means of each column. It would then be possible by means of a control application matrix of this kind to switch over, for example, between different measured-value converters that are based on a wide variety of measured-value transfer processes. For example, the following standards or measured-value transfer methods could thereby be supported: Hiperface, SSI, processes based on square-wave signals or sine-wave signals, resolvers, or measured-value converters based on the so-called Panasonic standard.

Configuration parameters are preferably provided for configuration. These configuration parameters can be implemented in the form of binary codes, for example in the form of 8-, 16-, 32-, or 64-bit words. The configuration parameters could be stored, for example, in a memory of the arrangement. By means of the individual bits of these words, it is possible to carry out configurations of the arrangement and to specifically switch on or switch off individual components or means of the arrangement, depending on which measured-value data transfer process or which measured-value converter is to be supported by means of the means. It is also possible to equip the arrangement with parameterization interface through which the configuration parameters can be fed into the arrangement. This approach would be preferable if the arrangement is integrated, for example, into a drive controller that is likewise parameterizable by means of parameters, in which case, upon parameterization of the drive controller, the arrangement according to the present invention could then be parameterized by means of the parameterization interface in parallel with the drive controller.

The control application means is preferably implemented by means of a programmable logic module (FPGA). The use of programmable logic modules means that hardware outlay is drastically reduced, and that the necessary functions can be implemented easily and economically. The different communication protocol libraries for carrying out the implementation of communication with the measured-value converter can be stored in the evaluation means. It would also be possible, of course, to retain these libraries in a separate memory.

The arrangement preferably also encompasses a control voltage generator. This has the advantage that a resolver is connectable to the arrangement. To support resolvers, the arrangement can generate an alternating excitation signal that is transferable to the resolver and that is in turn receivable by the arrangement in the form of two signals that are separated from one another and are shifted in one phase and enclosed by an envelope curve.

Measured values conveyed according to the following principles can preferably be evaluated by the arrangement according to the present invention: Endat standard, Hiperface standard, SSI standard, square-wave signals (two-track with reference pulse), sine-wave signals (two-track with reference pulse), resolver, Panasonic standard. The communication protocols or measured-value data transfer principles required for these standards are stored in the arrangement. Implementation of the standards is achieved by means of a logic that can be encompassed by the programmable logic module and can be executable by said logic module.

Particularly preferably, the arrangement is implemented in such a way that the supply voltage of the measured-value converter is measurable by means of a single electrical lead (sense lead), such that if said supply voltage falls below a parameterizable threshold value, said voltage can be raised again substantially to the threshold value in consideration of the measured value. It is assumed in this context that the voltage drop on the supply lead very largely corresponds to the voltage drop of the ground lead (GND). The supply voltage present at the measured-value converter is conveyed for this purpose to the arrangement according to the present invention, the latter encompassing a voltage regulator that, in consideration of substantially twice the measured value, is adjusted in such a way (regulation function) that the desired supply voltage is present at the transducer system in consideration of the ascertained supply voltage deviation from the desired standard value. This has the advantage that the voltage at the transducer system or at the measured-value converter can be kept constant at, for example, 5 volts, and that supply voltage correction for the measured-value converter can be implemented by means of a single lead. This reduces the number of connecting pins for the mechanical interface of the arrangement.

The connecting means preferably encompasses a mechanical connecting means for detachable mechanical connection of the measured-value converter to the evaluation means, as well as a measuring means for sensing the characteristic properties of the measured values of the measured-value converter, as well as a digitizing means for digitizing the measured values of the measured-value converter, as well as a voltage supply means for generating in particular at least two voltage levels. By way of these coacting means, analog signals can be digitized and measured, reference pulse evaluations can be carried out, and a wide variety of supply voltages for measured-value converters can be outputted. The interaction according to the present invention of the aforementioned means thus makes it possible to support the transducer systems already mentioned (Endat, SSI, Hiperface, square-wave transducers, sine-wave transducers, Panasonic transducers, resolvers, etc.).

The arrangement according to the present invention is preferably encompassed by a device for operating an electrical machine, the device encompassing a parameter memory so that the arrangement according to the present invention becomes parameterizable by means of at least one parameter stored in the parameter memory of the device. In the course of ordinary parameterization of the device (drive controller or drive amplifier) during setup, the arrangement can therefore also be simultaneously and automatically parameterized during setup.

The object is likewise achieved by means of a method for operating the arrangement, said arrangement independently creating a communication connection with the measured-value converter by the fact that an automatic and continuous selection of communication protocols occurs until a communication connection has been created. The arrangement accordingly first attempts, by selecting the various protocols already mentioned previously that are stored in the arrangement (Endat, Hiperface, Panasonic, etc.), to establish communication with the transducer system. This has the advantage that depending on the result of this connection attempt, further steps can be initiated that are executable in completely automated and independent fashion by the arrangement according to the present invention.

Upon successful creation of a communication connection with the measured-value system, an electronic identification plate that as a rule is encompassed by said measured-value system is preferably read out fully automatically by means of the arrangement according to the present invention. After readout, at least the type and resolution of the transducer system are therefore known to the arrangement according to the present invention. The arrangement can thus automatically adapt to said transducers with no need for manual interventions, for example by a setup technician. This approach according to the present invention thus helps reduce cost and time in the context of setup.

For the case in which creation of a communication connection fails, the arrangement can output a notification, for example, to the setup technician, for example by means of a human-machine interface (HMI). This precludes troubleshooting, and helps save time and cost. In this case the setup technician or an operator of the system must him- or herself ascertain the resolution and the characteristic data of the measured-value converter (for example by means of the mechanical identification plate of a transducer), and stipulate them manually via a parameterization interface. These parameters can then be stored in the parameter memory of the drive controller, which for example could be encompassed by the arrangement according to the present invention, or in a memory of the arrangement according to the present invention. Parameterization memories are usually not volatile memories, so that the inputted parameters are always available again even after shutoff even without a new input.

BRIEF DESCRIPTION OF THE DRAWINGS

The Figures described below are intended solely to be useful with regard to comprehension of the present inventions. They do not, for example, limit the inventions to the exemplifying embodiments. The Figures are to be considered merely schematic, in order to present the principles of the invention. The Claims do not confine or limit the disclosure and thus the possibilities for combination among all the features present. All the features present are also explicitly encompassed, individually and in combination with all other features of the invention, by this disclosure.

DETAILED DESCRIPTION OF THE INVENTION

Figure 1:
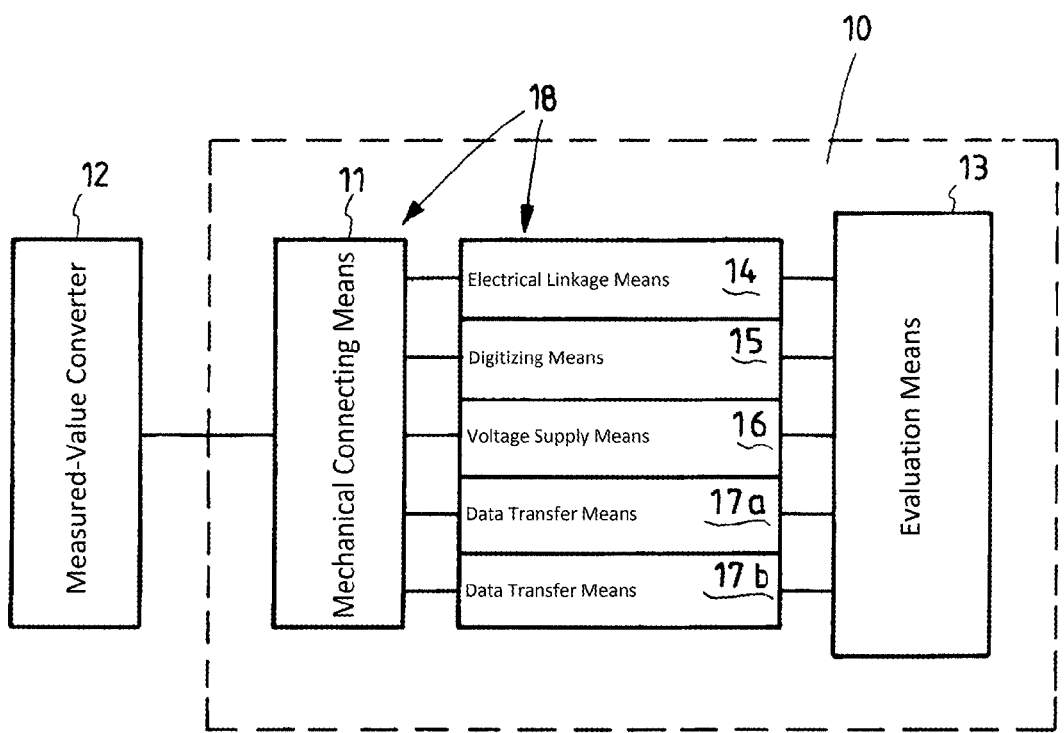
FIG. 1 shows the configuration of the arrangement according to the present invention, in the form of a block diagram.

FIG. 1 depicts the arrangement according to the present invention, with its components, in merely schematic fashion. Arrangement 10 according to the present invention (dashed lines) encompasses a mechanical connecting means 11 for detachable mechanical connection of measured-value converter 12 to the arrangement according to the present invention. Also encompassed by arrangement 10 according to the present invention is evaluation means 13, which serves to evaluate the measured data furnished by measured-value converter 12. Evaluation means 13 furthermore prepares the data furnished by measured-value converter 12 in such a way that the data can be directly further processed, for example, by a drive control device or a drive amplifier. Linkage of evaluation means 13 to measured-value converter 12 is accomplished by means of connecting means 18. Connecting means 18 encompasses, in addition to a mechanical interface 11, further means 14, 15, 16, 17a, 17b for electrical linkage of evaluation means 13 to measured-value converter 12. Mechanical connecting means 11 has only the function of electrically connecting, to evaluation means 13, the signal lines proceeding from measured-value converter 12, whereas means 14, 15, 16, 17a, and 17b connected in parallel between evaluation means 13 and mechanical interface 11 implement electrical, and therefore signal-related, linkage of evaluation means 13 to measured-value converter 12. Means 14 serves to sense the characteristic properties of the measured values of measured-value converter 12. It serves, for example, to sense in terms of measurement engineering the signal furnished by the measured-value converter. This can involve both analog and digital signals. A digitizing means 15 is likewise encompassed so that signals in digital form can be further processed. Digitizing means 15 receives analog signals by means of mechanical interface 11, and converts them into digital form in such a way that they can be further processed, also in digital form, by evaluation means 13.

A voltage supply means 16 that serves to generate, in particular, multiple voltage levels is furthermore provided. These voltage levels can be, for example, reference voltages that are necessary for operation of the measured-value converter. The aforementioned voltage supply means could also be used to make available a supply voltage for the measured-value converter.

Data transfer means 17a, 17b are also encompassed by connecting means 18. These transfer means 17a, 17b can be, for example, driver modules for communication (e.g. multiple RS485 modules).

All the aforementioned means 14, 15, 16, 17a, and 17b respectively occupy one or more connector pins on mechanical interface 11, and are connected in parallel between evaluation means 13 and mechanical interface 11. This means that simultaneous parallel operation of all means 14, 15, 16, 17a, 17b is achievable. The arrangement can therefore accordingly, for example, simultaneously digitize a received analog measurement signal and evaluate a reference signal.

Figure 2:
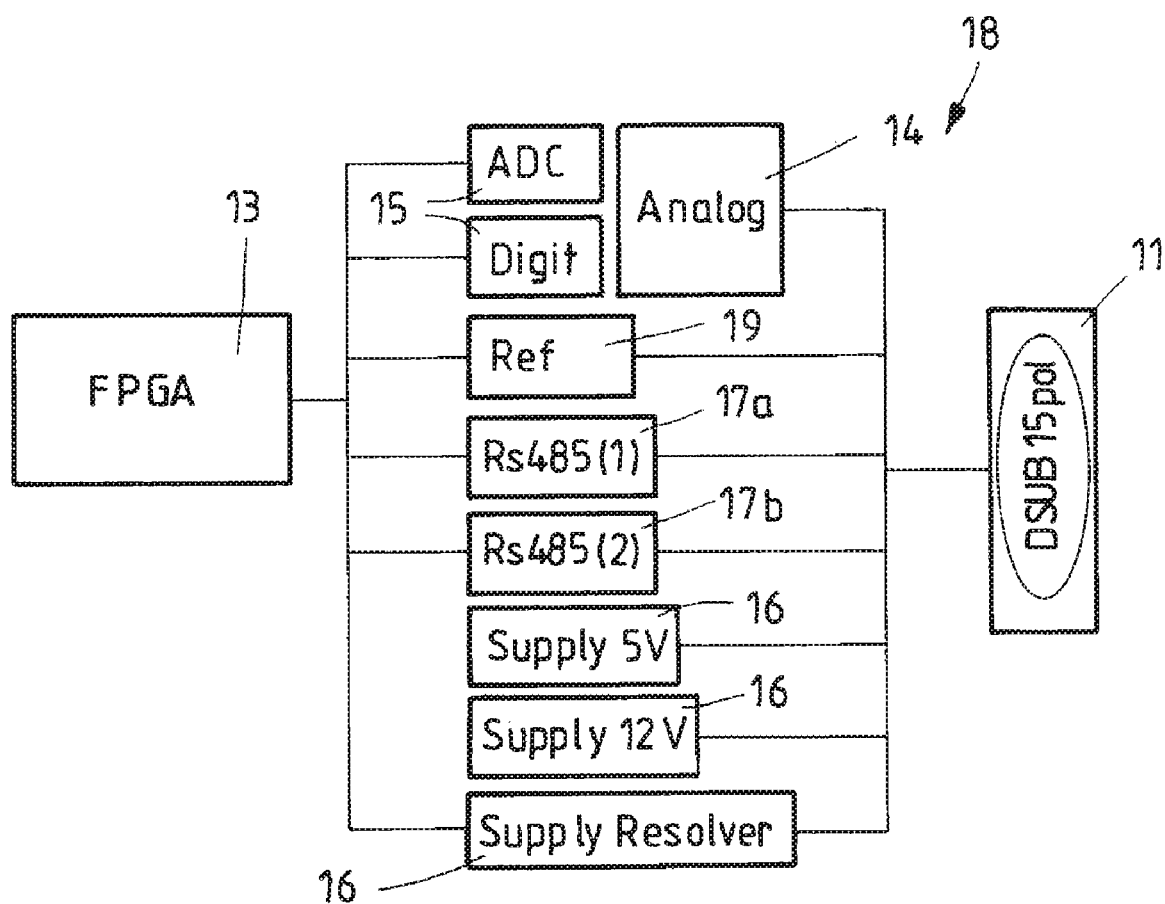
FIG. 2 shows, in somewhat more detail than FIG. 1, the means by which the arrangement according to the present invention is implemented.

FIG. 2 shows the arrangement according to the present invention in somewhat more detail than the block diagram of FIG. 1. It indicates that evaluation means 13 may be implemented in the form of a field programmable gate array (FPGA). Connecting means 18 encompasses both a mechanical interface 11 in the form of a D-sub plug or a D-sub socket, and an electrical interface that is implemented in the form of a plurality of electrical components or means (15=ADC, 19=reference pulse evaluation system, 15=digitizing device for an analog track device, 17a, b=drivers for communication and square-wave evaluation, 16=supply voltage for transducer systems and/or resolvers).

All these aforementioned components/means are arranged in parallel between FPGA 13 and mechanical interface 11, and can be operated in parallel. Activation or deactivation, and configuration, of these components/means is accomplished by parameterization by means of parameters stored in a memory (not shown) encompassed by the arrangement. The apparatus according to the present invention supports up to ten different transducer systems for measured values, and is thus highly flexible.

Figure 3:
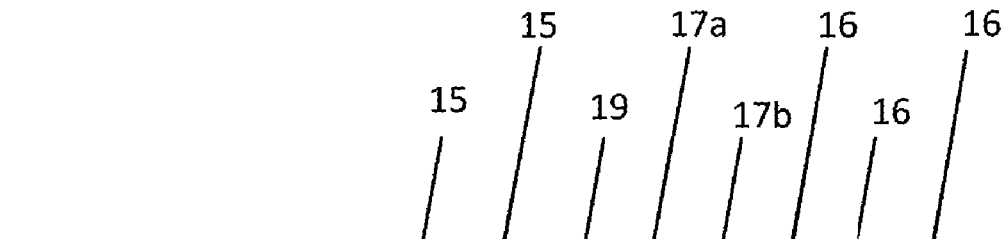
FIG. 3 shows the possible memory configuration for implementation of a control application matrix.

FIG. 3 shows, by way of example, how a control application matrix according to the present invention might be implemented by means of a table. FIG. 3 shows the configuration and the contents of the table. The table is made up of eight columns relevant to control application, and eleven rows relevant to control application. Each column represents one of the freely configurable electrical means 14, 15, 16, 17a, b that are encompassed by connecting means 18. Each row encompasses a possible operating mode of the arrangement according to the present invention. At the point at which the columns and lines intersect, an indication is given in the table as to which of the means 14, 15, 16, 17a, b, known from the columns, of the arrangement according to the present invention are necessary in order to implement the operating mode defined by means of the rows.

For example, two bidirectional RS485 drivers 17a, b are implemented. Only one of the two drivers 17a, b is necessary for asynchronous communication, such as Hiperface and Panasonic, the driver direction being switchable for transmit and receive mode. For synchronous communications such as Endat and SSI, a driver for transmitting the clock cycle is set to output. The second driver is used to transmit and receive data, the direction being correspondingly switchable. For square-wave transducers with a 5 VTTL level, both drivers 17a, b are set to input in order to receive the incremental signals. Multiple utilization of drivers 17a, b, and of the connected pins on the plug, is therefore achieved.

In order to create compatibility with the Endat 2.1 transducer system (first row), it would then be necessary according to the table to parameterize means 15=ADC+Digit, means 17a=RS485(1), means 17b=RS485(2), and means 16=Supply 5 V.

To implement the Panasonic system, on the other hand, it would be necessary simply to parameterize means 17a=RS485(1) and 16=Supply 5 V. The Panasonic system has an asynchronous interface (UART) at 2.5 Mbaud. Communication is implemented via an RS485 module (transmit/receive switchover). The levels correspond to the RS485 standard. Supply voltage is 5 V. Position is read out cyclically from the transducer system by means of the arrangement according to the present invention. The evaluation means of the arrangement is the communication master.

In the case of incremental transducers such as square-wave transducers or sin/cos transducers, in the absence of communication, the position within a mechanical revolution of the transducer system is not known after switch-on. These systems output one short reference pulse (always at the same location) for each revolution. After switch-on, the shaft is moved until this pulse is detected. The position within a revolution can thereby be ascertained. Means 17a=RS485(1), 17b=RS485(2), and 19=Ref (reference pulse evaluation) would need to be parameterized in order to implement a square-wave transducer (5 V).

The parameterization of the arrangement according to the present invention necessary for all the measured-value converters to be supported can therefore be read out from the table, so that the arrangement according to the present invention becomes parameterizable by means of the FPGA or some other higher-level logic system. The columns allocated to the individual measured-value converter principles could easily be represented, for example, by an 8-bit word. The 8-bit word is represented by the rows allocated to the transducer systems. If a bit is set to 1, this can correspond, for example, to an activated means 14, 15, 16, 17a, b. Conversely, if a bit is erased (set to zero), this could correspond to a deactivation of means 14, 15, 16, 17a, b. Eleven parameters of 8 bits each (11×8-bit words) would therefore be necessary for the eleven measured-value converters that are depicted here and require support.

What is claimed is:

1. An arrangement for evaluating the measured values of a measured-value converter (12), the arrangement comprising:
   an evaluation means (13);
   a control voltage generator; and
   connecting means (18) for linking the evaluation means (13) to the measured-value converter (12), wherein the connecting means (18) includes a plurality of electrical means (11, 14, 15, 16, 17a, b) that are electrically configurable;
   whereby the evaluation means (13) can be linked to various types of measured-value converters (12) that differ with regard to measured-value data transfer, and
   wherein the measured-value converter (12) is a resolver, and the arrangement generates an alternating excitation signal that is transferable to the resolver and that is receivable in the form of two signals that are separated from one another and are shifted in phase and enclosed by an envelope curve.

2. The arrangement according to claim 1, wherein a switchover capability between at least one asynchronous and one synchronous measured-value data transfer is provided.

3. The arrangement according to claim 2, wherein the plurality of electrical means includes a first data transfer means (17a) that is switchable between transmit mode and receive mode to implement asynchronous measured-value data transfer.

4. The arrangement according to claim 3, wherein the plurality of electrical means further includes a second data transfer means (17b) configurable to generate a clock cycle to implement synchronous measured-value data transfer, and wherein transmission and reception of measured-value data occurs by means of the first data transfer means (17a).

5. The arrangement according to claim 4, wherein the first and second data transfer means (17a, b) are configurable such that they can simultaneously transmit and/or receive data.

6. The arrangement according to claim 1, wherein a control application matrix is provided for configuration.

7. The arrangement according to claim 1, such that configuration parameters are provided for configuration.

8. The arrangement according to claim 1, wherein the evaluation means (13) includes a programmable logic module.

9. The arrangement according to claim 1, wherein different communication protocol libraries for implementing communication with the measured-value converter (12) are stored in the evaluation means (13).

10. The arrangement according to claim 1, wherein the arrangement is configurable to evaluate measured values conveyed according to at least one of the following principles:
measured values coded according to the Endat standard; measured values coded according to the Hiperface standard; measured values coded according to the SSI standard; two-track square-wave signals with reference pulse; two-track sine-wave signals with reference pulse; the output voltages of a resolver; and measured values coded according to the Panasonic standard.

11. The arrangement according to claim 10, wherein the evaluation means (13) includes a programmable logic module, and wherein the standards are implemented by means of a logic stored and executed by the programmable logic module.

12. The arrangement according to claim 1, wherein the arrangement includes a single electrical lead arranged to measure a supply voltage of the measured-value converter 12, and if said supply voltage falls below a parameterizable threshold value, said supply voltage is raised substantially to the threshold value.

13. An arrangement for evaluating the measured values of a measured-value converter (12), the arrangement comprising:
an evaluation means (13);
connecting means (18) for linking the evaluation means (13) to the measured-value converter (12), wherein the connecting means (18) includes a plurality of electrical means (11, 14, 15, 16, 17a, b) that are electrically configurable, a mechanical connecting means (11) for mechanical connection of the measured-value converter (12) to the evaluation means (13), a measuring means (14) for sensing characteristic properties of the measured values of the measured-value converter (12), a digitizing means (15) for digitizing the measured values of the measured-value converter (12), and a voltage supply means (16) for generating at least two voltage levels;
whereby the evaluation means (13) can be linked to various types of measured-value converters (12) that differ with regard to measured-value data transfer.

14. The arrangement according to claim 13, wherein the connecting means (18) includes a means (19) for evaluating a reference pulse generated by the measured-value converter (12).

* * * * *